United States Patent [19]

Konishi et al.

[11] Patent Number: 5,174,956
[45] Date of Patent: Dec. 29, 1992

[54] METHOD FOR DEODORIZATION OF CORK

[75] Inventors: Ichiro Konishi, Kanagawa; Ryoichi Tajima, Shiga; Tetsuo Tsutsumi, Tokyo, all of Japan

[73] Assignee: Suntory Limited, Japan

[21] Appl. No.: 825,332

[22] Filed: Jan. 27, 1992

Related U.S. Application Data

[63] Continuation of Ser. No. 513,842, Apr. 24, 1990.

[30] Foreign Application Priority Data

Apr. 26, 1989 [JP] Japan .................. 1-106781

[51] Int. Cl.⁵ .......................... A61L 2/00; F26B 7/00
[52] U.S. Cl. .......................................... 422/5; 422/1; 422/26; 264/124; 34/12; 34/13; 34/22
[58] Field of Search ................. 422/1, 5, 26, 291, 295, 422/298, 299, 292; 34/12, 13, 22; 264/124; 366/220, 233, 237, 239; 202/164, 175, 234, 238; 203/95, 96

[56] References Cited

U.S. PATENT DOCUMENTS

| | | | |
|---|---|---|---|
| 1,610,339 | 12/1926 | Warth | 422/292 |
| 1,641,712 | 9/1927 | Warth | 422/292 |
| 1,960,890 | 5/1934 | Bidwell | 422/26 |
| 3,088,179 | 5/1963 | Leuthner | 422/114 |
| 4,146,335 | 3/1979 | Hutchings et al. | 366/242 |
| 4,395,383 | 7/1983 | Kackos | 422/26 |

FOREIGN PATENT DOCUMENTS

| | | |
|---|---|---|
| 28312 | 12/1906 | Australia . |
| 267733 | 12/1906 | Fed. Rep. of Germany . |
| 176526 | 8/1919 | Fed. Rep. of Germany . |
| 1642205 | 1/1973 | Fed. Rep. of Germany ........ 422/28 |
| 389994 | 3/1933 | United Kingdom . |
| 661453 | 11/1951 | United Kingdom . |
| 993883 | 6/1965 | United Kingdom . |
| 1064386 | 4/1967 | United Kingdom . |

OTHER PUBLICATIONS

Buser et al., "Identification of 2,4,6-Trichloroanisole as a Potent Compound Causing Cork Taint in Wine", Journal of Agricultural and Food Chemistry, 30, 1982, 359-362.

Primary Examiner—Robert J. Warden
Assistant Examiner—T. A. Trembley
Attorney, Agent, or Firm—Ronald P. Kananen

[57] ABSTRACT

A method for deodorization of cork accomplished by applying steam distillation to remove substances originating offensive odor in the cork is disclosed. The method comprises a first step of putting the cork into a container, a second step of supplying steam generated in a steam generator to the container, and a third step of discharging the steam along with the substance originating the offensive odor from the container. An apparatus for deodorization of cork by this method is also disclosed.

14 Claims, 4 Drawing Sheets

METHOD FOR DEODORIZATION OF CORK

This application is a continuation of application Ser. No. 07/513,842 filed Apr. 24, 1990.

BACKGROUND OF THE INVENTION

1. Field of the Invention

The present invention relates to removing offensive odors from cork. Specifically, the present invention relates to removing 2,4,6-trichloroanisole (TCA) which has a characteristic odor.

2. Description of the Background Art

Cork has unique characteristics. It is lightweight and has a high degree of resilience. Additionally, it has excellent gas and liquid sealing properties, and has stability against solvents such as alcohol. Furthermore, it is a hygienic material which is food-safe and not harmful to human beings, and has no intrinsic odor.

Because of the above mentioned characteristics, cork has been widely utilized as stoppers for casings such as bottles filled with liquor such as wine, brandy or whiskey, or casings packed with various kinds of foods.

However, in spite of having no intrinsic odor, offensive odor is encountered on cork stoppers on rare occasions. This odor, when present, deteriorates the quality of the contents of the bottles or casings sealed by the cork. Recently, by various studies, 2,4,6-trichloroanisol (TCA) has been identified as the substance which originates the offensive odor. TCA is considered as the substance produced by moulds from 2,4,6-trichlorophenol (TCP) which is utilized in agents conventionally used to spray to cork oak. Also, in "Journal of Agricultural and Food Chemistry", (1982) pages 359 to 362, presumption is given that 2,4,6-trichlorophenol and other related chlorinated compounds originate from chlorination of a liquid-related substance during the chlorinate bleaching used in the processing of the cork and that these compounds are later extracted into the liquor, such as wine. Similar consideration that a clorinate agent is the source of the odor substance has been given in "Science des Aliments" (1984), pages 81 to 93. In the discussion, it has been pointed out that the 2,4,6-trichloroanisol is derived from pentachlorophenol or other chlorinated pesticides applied to the tree. Further consideration is given that cork material and corks stored in premises with an atmosphere polluted by chloroanisoles may contaminate bottled wine aged in healthy cellars.

Methods for effective deodorization of cork have been studied, and the following methods have been attempted.

(1) Dry-heating deodorization

Cork is heated and dried at 80° C. for 6 to 8 hours, after which the offensive odor causing substances are substantially evaporated. However, TCA is specifically adsorbed by the macromolecular compounds which form cork such as cellulose, lignin and suberin, and it is difficult to remove TCA in the dried state. The boiling point of TCA is 240° C. at 738.2 mmHg, and 132° C. at 28 mmHg. Therefore, in order to evaporate TCA, a heating temperature must be applied which is higher than the boiling point of TCA. However, it is difficult to raise the internal temperature of cork without heating the surface excessively, which results in deterioration of cork's desirable characteristics. As such, heating is applied only to the surface of the cork, therefore TCA in the interior cannot be removed entirely.

(2) Repetition heating deodorization

Cork is heated at 80° C. for 6 hours, and is then left at room temperatures for about a month. TCA can be removed by repeating this treatment many times. However, this method requires long periods of treatment until the TCA is entirely removed; therefore, production efficiency is low. For example, 2 or 3 repetitions of the above treatment is insufficient for entirely removing TCA.

(3) Citric acid deodorization

Cork is deodorized by being soaked in a 3 vol % solution of citric acid for 3 to 5 min. However, the effects of this deodorization technique are retained only for a short period. That is because, as cork resists absorption of liquids, the citric acid solution cannot reach the cork interior. Therefore, since the deodorizing treatment affects only the cork surface, untreated TCA within the cork is moved to the cork surface with the elapse of time; thus, the offensive odor re-occurs.

(4) Oxidant bath deodorization

Cork is deodorized and sterilized by soaking in a 1 vol % solution of hydroperoxide ($H_2O_2$). However similar problems are caused as in the case of citric acid deodorization.

(5) Alcohol steam deodorization

Cork is left and deodorized in an alcohol atmosphere at 18° to 24° C. for a month. However, this method encounters the same problems as methods (3) and (4).

(6) Hot water washing

Cork in the grain state is washed in hot water at a temperature of 60° C. The treatment needs to be repeated 2 times. But, as TCA has a relatively strong affinity for cork, it is moved to and retained in the internal portions of the cork. According to this method, therefore, the deodorizing effect is still insufficient because the treatment affects only the cork surface.

(7) Soxhlet extraction

TCA in the cork is extracted by a Soxhlet extractor at 45° C. for 24 hours with n-pentane. By this method, TCA is entirely removed from both the surface and internal areas of the cork. However, the equipment is very expensive and production costs become very high. Furthermore, a certain degree of safety risk is encountered with this method.

(8) Dispersion

It has been considered to simply grind the cork into grains having a certain diameter, and then form it back into the desired form by pressing with adhesives. However, since TCA is merely dispersed in each grain, high improvement cannot be expected from this approach.

(9) Sterilization with Irradiation

"Deutsche Lebensmittel-Rundschau" (1984) Pages 204-207, is directed to sterilization with irradiation. There, the mechanism of formation of cork taint in wines is discussed. An irradiation process has been proposed for preventing the use of microbial conversion from TCP to TCA, thus achieving prevention of cork taint. However, this method cannot remove TCA residing within internal structure of the cork

(10) Sterilization with Ozone

German Patent First Publication No. 34 05 422 discusses that cork is sterilized with ozonized water or ozonized an silicone emulsion, in which the ozonized concentration is Pl mg/l at a temperature lower than 30° C.

However, this method encounters the same problems as methods (3) and (4).

SUMMARY OF THE INVENTION

It is therefore, the principal object of the present invention to provide a method for deodorizing cork by removing a substance causing offensive odors, principally TCA from the cork interior.

It is another object of the present invention to provide a method for deodorization of cork without deteriorating cork's unique characteristics.

It is a further object of the present invention to provide an apparatus for simply and inexpensively deodorizing the cork.

According to one aspect of the invention, a method for deodorization of cork comprises the step of applying steam distillation to the cork to remove a substance originating offensive odor in the cork, wherein a temperature and pressure of steam for deodorization treatment is so selected as to penerate steam molecules into the internal structure of cork.

According to another aspect of the invention, a method for removing a substance originating an offensive odor in the cork comprising the steps of:

a first step of putting the cork into a container, a second step of supplying steam to the container for generating steam flow at a given temperature and a given pressure, the temperature and pressure being selected for penetrating steam molecules into an internal structure of the cork and promoting steam distillation within the internal structure of the cork, a third step of discharging the steam past the cork and containing the substance originating offensive odor from the container.

The substance originating the offensive odor may the be 2,4,6-trichloroanisole, and the 2,4,6-trichlorophenol.

The method further comprises the steps of:

cutting the cork into pieces having a predetermined size, pre-heating the cut cork to a certain temperature, and maintaining the temperature and the pressure during deodorization.

In such case, the steam temperature is at least 100° C. and; the system pressure is at least 760 mmHg. In the preferred embodiment, the second step further comprises supplying the steam for the cork from the bottom of the container. The second step may further comprise agitating the container. In such case, the agitating step is comprised of rotating and/or oscillating the container. The agitating step may a step of stirring the cork in the container.

The method may further comprise a step of cooling the cork in the container. The cooling step may include the steps of:

generating a hot atmosphere, and supplying the hot atmosphere to the interior of the container while maintaining rotation and oscillation of the container.

Preferably, the step of supplying the atmosphere is performed after natural cooling and at a timing where cooling efficiency by natural cooling is lowered.

According to a further aspect of the invention, an apparatus for deodorization of cork by steam distillation comprises:

means for generating a flow of steam at a given temperature and a given pressure which are selected for causing steam distillation within the internal structure of the cork to remove a substance originating an offensive odor contained in the cork.

According to a still further aspect of the invention, an apparatus for deodorization of cork comprises:

first means for containing the cork, second means for supplying steam from a steam generator for forming a steam flow from an inlet to an outlet of the first means, the steam in the steam flow being maintained at a given temperature and a given pressure selected for removing a substance causing offensive odor from the cork, third means for discharging the steam along with the substance causing offensive odor through the outlet of the first means.

BRIEF DESCRIPTION OF THE DRAWINGS

The present invention will be understood more clearly from the preferred embodiments described herebelow and from the appended drawings which illustrate the detailed composition of the embodiments, which, however, should not be taken to limit the invention but are for explanation and understanding only.

In the drawings.

DETAILED DESCRIPTION OF THE INVENTION

Figure 1:
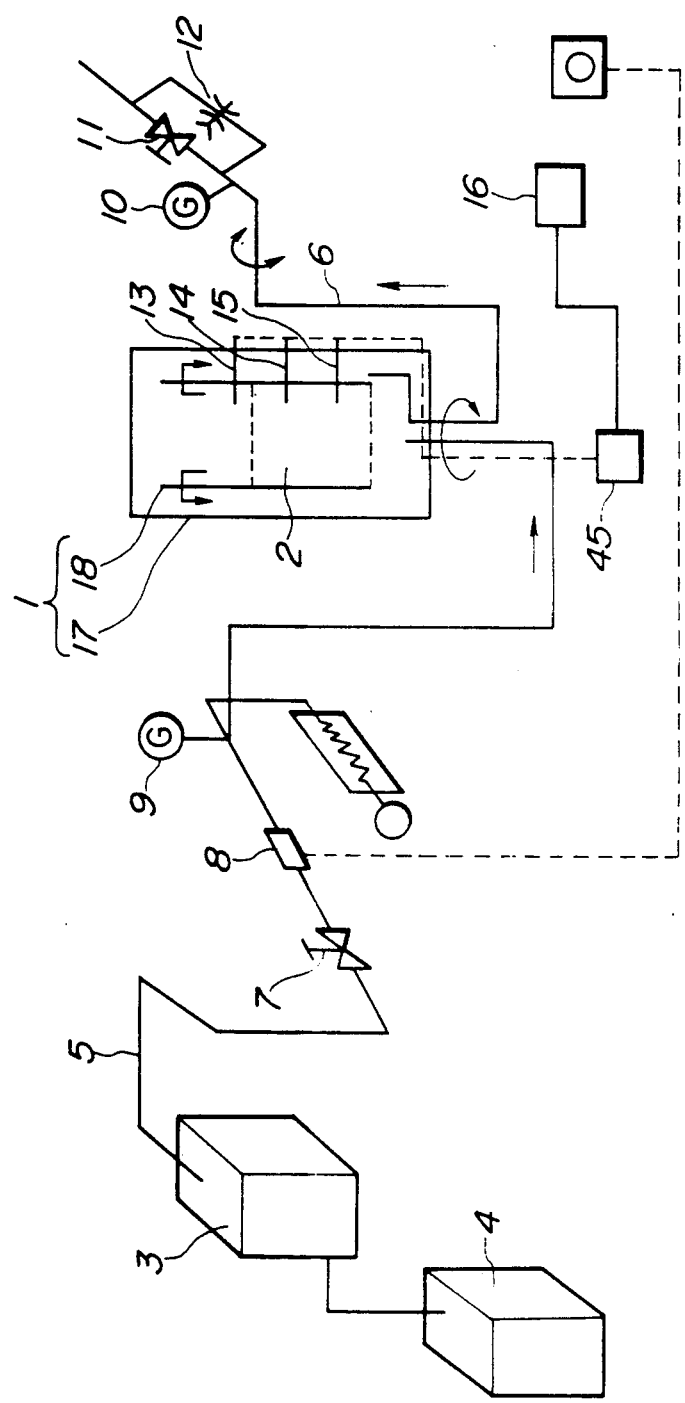
FIG. 1 is a block diagram showing a method for removing offensive odor substances according to the present invention.

The present invention is accomplished by utilizing conventional steam distillation.

As is well known, the cork has a water resistive property to prevent water molecules from penetrating into the internal structure thereof. Therefore, though it is known that TCA on the surface of the cork can be washed out by water, internally contained TCA cannot be removed by water. To this point, it has been known that TCA has a characteristic which is that it can volatilize with steam. Additionally, it has a relatively low boiling point at 28 mmHg. Therefore, if treating temperatures are controlled at the level at which the partial pressure of TCA becomes 28 mmHg, TCA can be evaporated at relatively low temperatures. Taking the factors mentioned above into consideration, the inventors became aware that steam distillation may be effectively utilized for the deodorization of cork. Previously, steam distillation had never been applied for cork deodorization. In various attempts made by the inventors, it has become apparent to the inventors that steam temperature and pressure are very important factors for enabling steam distillation. Particularly, according to the invention, the steam is enabled to penetrate into the internal structure of the cork for heating the internal structure so that steam distillation is caused within the internal structure for removing TCA residing inside of the cork.

It is considered that molecules of steam can be excited for increasing mobility under a given temperature. Such increased mobility of steam molecules is enabled to successfully penetrate into the internal structure of the cork. The steam molecules penetrated into the internal structure of cork heat the inside of cork to the temperature at which steam distillation is internally caused. By this, TCA contained in the internal structure of the cork cna be evaporated.

Any kind of cork may be used and is not limited by the field of use tonwhich it is put nor by its form. For example, cork for bottle capping, wine bottle stoppers or crown disks, for architectural use, vibration proofing or heat insulator materials may all benefit from treatment according to the present invention.

The shape of the container is not limited specifically, but for effective steam utilization, a longitudinal shape for the container which is formed with a diameter smaller than its height is most preferred.

Any state of cork is acceptable, but for enhancing the removal efficiency by homogenizing steam and cork, maintaining the cork, in an agitated state while supplying steam to the container is preferable. For agitating, to move the container per se (e.g., by oscillating or rolling) or to locate an agitating means in the container to stir the inner materials are both acceptable.

In general, the steam temperature should be at least 100° C., and, the pressure of the container should be at least 760 mmHg. When the steam temperature is lower than 100° C., the partial pressure cannot be high enough to cause steam distillation within the internal organization of the cork. Also at the temperature lower than 100° C. penetration of steam molecules into the internal structure of cork may not be sufficient. On the other hand. when the steam temperature is higher than 130° C., difficulty is encountered in controlling temperature during cooling process. That is, at high steam temperature, a significant amount of steam can penetrate within the internal structure. The steam that penetrates within the internal structure of the cork may lead to shrinking of the cork when it is subjected to atmospheric temperature as a result of rapid cooling. A significant magnitude of cork shrinkage may degrade the cork properties. Therefore, the temperature is preferably maintained lower than or equal to 130° C.

Cork size is not limited specifically, but a smaller size is preferred because TCA movement from within the cork to its surface becomes easier. This results in an effective removal of TCA.

It should be appreciated that the treatment temperature, the system pressure, the container configuration the cork amount to be treated, and other conditions for steam distillation treatment can be selected according to required efficiency and degree of removal of TCA.

According to the above identified steam distillation, the partial pressure of TCA can be reduced by the partial pressure of steam, then the boiling point of TCA can be lowered at around atmospheric pressure. Therefore, deterioration of cork can be avoided and deodorization of cork by removal of TCA can be accomplished sufficiently.

A method for removing offensive odor in the cork according to the present invention is described in detail referring to the appended Figures which show the processing system for TCA removal.

Referring now to FIG. 1, a block diagram showing the method for removing offensive odor according to the present invention is shown. A given amount of cork 2 cut to a predetermined size is put into a treating container 1. Purified water provided from a purified water generator 4 is supplied to a steam generator 3. Then, after steam is generated in the generator 3, it is supplied to the container 1 via a steam supply pipe 5. Steam distillation of the cork 2 is performed in the container 1, then steam is discharged from the container 1 through a steam discharge pipe 6 out of the system. Steam feeding is controlled by a supply valve 7, a flow meter 8, pressure meters 9 and 10, a discharge valve 11, and a flow control valve 12. Temperature sensors 13, 14 and 15 are installed in upper, middle and lower ports of container 1, respectively. The temperature in the container 1 is monitored through these sensors by a monitor system 16, then temperature is controlled at the constant predetermined level.

Figure 2:
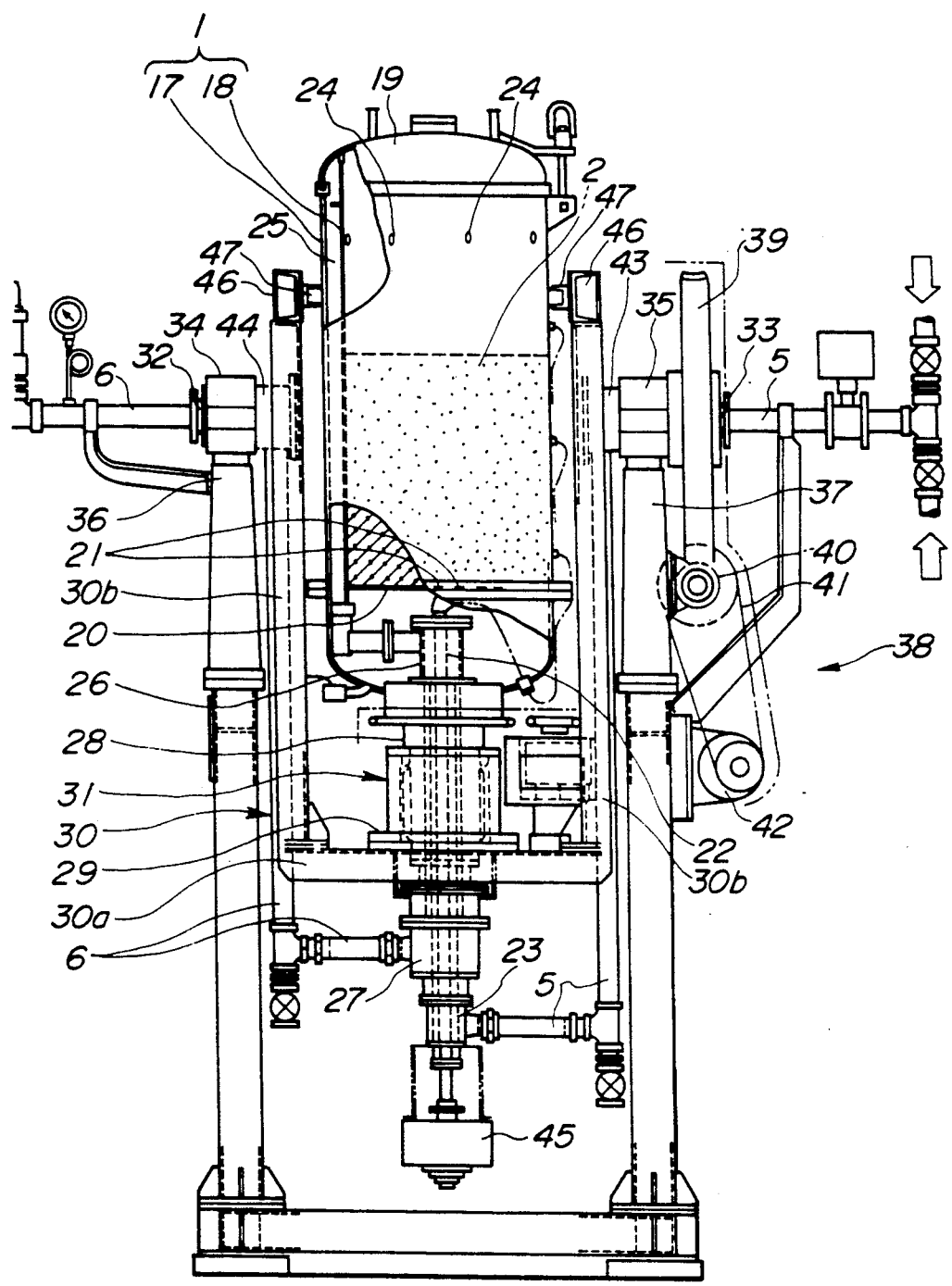
FIG. 2 is a sectional view of an apparatus for deodorization of cork according to the present invention.

The container 1 has an outer container 17 and an inner container 18 spaced from the outer container 17 at a constant interval as shown in FIG. 2. It may be formed as a cylinder. In this way, the container 1 is formed as a pressure proof container having a double-walled structure. This structure enables steam to be introduced into the space between the outer and the inner wall after it goes through the cork 2. Therefore, steam in the space through which the steam past the cork flows, serves for maintaining the container temperature at the desired treatment temperature and thus for reducing the heat loss in the steam.

Referring now to FIG. 2, when amounts of cork 2 are put into the inner container 18 by opening a lid 19, they pile on a bottom plate 20. Steam is sprayed into the interior of the container 1 through a plurality of steam pores 21 penetrating the bottom plate 20, and runs through the piled cork 2 from bottom to top.

A steam inlet pipe 22 is connected to the center port of the container's bottom and extends from the lower end of the outer container 17 of the container 1 to the outside of the container. The lower edge of the inlet pipe 22 is connected to the steam supply pipe 5 via a first rotary joint 23. Steam fluid supplied from the supply pipe 5 is supplied to the inlet pipe 22, to the inner container 18 via the steam spraying pores 21 in the bottom plate 20 of the container 1. Then, steam supplied into the inner container 18 rises through the cork 2 concurrently heating it, and is discharged from steam discharging pores 24 which penetrate the upper side wall(s) of the inner container 18 into the space 25 between the outer container 17 and the inner container 18 and an outlet pipe 26 coaxially arranged surrounding the outside of the steam inlet pipe 22. Then, it is discharged from the steam discharge pipe 6 connected to the outlet pipe 26 via a second rotary joint 27. Pressure and flow of steam can be controlled at a constant level by the discharge valve 11 and the flow control valve 12.

In order to homogenize sprayed steam and the cork 2, agitating the material in the container 1 is effective. A central shaft 28 for rotation is located surrounding the outlet pipe 26, and is rotatably supported by a bottom portion 30a of an oscillating frame 30 formed in a U-shape via a bearing 29. The container 1 can be rotated against the central shaft 28 by a rotation drive device 31 installed on the bottom portion 30a of the oscillating frame 30 composed of a motor, rotation gear, translation gear or so forth. Additionally, the container 1 can be oscillated by the oscillating frame 30. Then, by rotating with oscillation, the cork 2 and steam in the container 1 can be agitated sufficiently. A pair of supporting shafts 32 and 33 are installed to an outer surface of an upper end of the side portions 30b of the oscillating frame 30. These shafts 32, 33 are oscillatably supported by a pair of fixed frames 36, 37 via bearings 34, 35 to be oscillated by an oscillation drive device 38.

The oscillation drive device 38 is composed of a worm wheel 39 installed on the supporting shaft 33 and a motor 42 which rotatably operates a worm gear 40 via a belt 41, where the worm gear 40 is engaged to gear teeth of the worm wheel 39. When the motor 42 is rotated in one direction, the worm gear 40 and the worm wheel 39 are rotated in order. This rotation slowly oscillates the oscillating frame 30 in one direction. On the other hand, when the motor 42 is rotated in the other direction, it slowly rotates the oscillating frame 30 in the other direction. In this way, the oscillating frame 30 is oscillated.

In order to supply steam regardless of oscillation of the oscillating frame 30, the steam supply pipe 5 is located through the center portion of the supporting shaft 33, connected to the oscillating frame 30 via a third rotary joint 43, and further connected to the container 1 via the first rotary joint 23. The steam discharge pipe 6 is located through the center portion of the other supporting shaft 32, connected to the oscillating frame 30 via a forth rotary joint 44, and further connected to the container 1 via the second rotary joint 27.

A slip ring 45 is mounted on the edge of the central shaft 28 of the container 1. Signals, obtained from temperature sensors 13, 14 and 15, connected to the outside portion of the oscillating frame 30 via the slip ring 45, are input to a monitoring device 16 which is connected to the slip ring 45 (as shown in FIG. 1) allowing the temperature in the container to be effectively monitored.

Circular frames 46 are mounted on the top of the side portion 30b of the oscillating frame 30. Rollers 47 are installed in the inner surface of the radial frames 46 to rotate the container 1 smoothly by supporting the outer surface of the upper port of the container 1.

In the shown embodiment, rotation speed of the container is preferably determined at, at least, 10 rpm, and the incline angle is preferably determined as at least ±60°, though they depend on conditions such as the processing amount and cork size. The inclination angle range of the container is not strictly limited to ±60° but can be selected in any way. In general, the inclination angle of the container may be determined according to the degree of filling of the cork within the interior space of the container. Namely, the inclination angle is so selected that the cork can be distributed over an entire area of the steam path so that steam cannot escape without contacting with the cork. Similarly, in case of rolling or agitation, care should be given so that blow off of the steam may not be caused. Therefore, driving speed in rolling and agitation may be determined according to the amount of the cork filled in the container.

Further to say, there is no problem processing by steam distillation in a stationary environment (not rotated or oscillated).

In order to avoid physically changing the cork, for example, by shrinking, it may be preferable to cool the cork slowly while maintaining the same within the container 1, because cork volume becomes smaller (shrunken) when it is subject to a substantially low temperature after penetration of steam of relatively high temperature. Particularly, since the temperature of the internal structure of cork cannot be cooled as fast as that on the surface, a relatively long period is required for satisfactorily cooling the internal structure of the cork. This means that if they are removed from the container immediately to the subject atmosphere, a substantial magnitude of shrinking may be caused in the cork to make it stiff to degrade the cork property. On the other hand, allowing natural cooling takes a very long time. Therefore, supplying a hot atmosphere to the container by way of cooling may be effective. Here, rotation and oscillation of the container 1 are continued while cooling. During natural cooling, it has been observed that cooling efficiency is significantly dropped at a certain temperature. In order to accelerate cooling, the hot atmosphere is generated in a hot atmosphere generator (not shown in the Figures), and is supplied to the container 1 by controlling the valve 7 located on the steam inlet side. As the cork 2 is wetted by steam, hot atmosphere supplied to the container 1 can take latent heat from the surface of the cork 2 when steam is evaporated. This increases the cooling speed. The results of cooling tests on the cork are shown in the following Table 1.

TABLE 1

| Repetition | 1 | 2 | 3 | 4 | 5 |
|---|---|---|---|---|---|
| Cooling periods (min.) | 47 | 48 | 47 | 50 | 46 |
| Volume ratio (%) | 111.4 | 98.0 | 95.0 | 96.4 | 104.7 |

Volume ratio (%): $\frac{\text{dried weight after treatment}}{\text{dried weight before treatment}}$ Materials are shrunken when this value becomes over 100.

Treatment indicates steam distillation.

| Test conditions: | |
|---|---|
| Flow amount of steam: | 280 l/hr. |
| Period of treatment: | 64 min. |
| Pressure (cage pressure): | 1 kg/cm. |

As shown in Table 1, shrinking of the cork was prevented.

EXAMPLE 1

In order to demonstrate the advantages accomplished by the present invention, experiments were performed. In the experiments, natural cork of the size 10 cm × 10 cm × 5 cm is heated in an autoclave for 60 minutes at respective temperatures of 100° C., 110° C., 120° C. and 130° C. The pressures at respective temperatures are shown in the following Table 2.

TABLE 2

| Temperature (°C.) | Pressure (Kg/cm$^2$) |
|---|---|
| 100 | 1.033 |
| 110 | 1.461 |
| 120 | 2.055 |
| 130 | 2.754 |

For checking depth or degree of penetration of steam into the internal structure of the cork, the cork piece samples were cut by a knife and the penetration dimension from the cork surface was measured. The result of measurement is shown in the following Table 3 and FIG. 3.

TABLE 3

| Temperature (°C.) | Penetration Magnitude (mm) |
| --- | --- |
| 100 | 0.5 |
| 110 | 5.0 |
| 120 | 10.0 |
| 130 | 20.0 |

Figure 3:
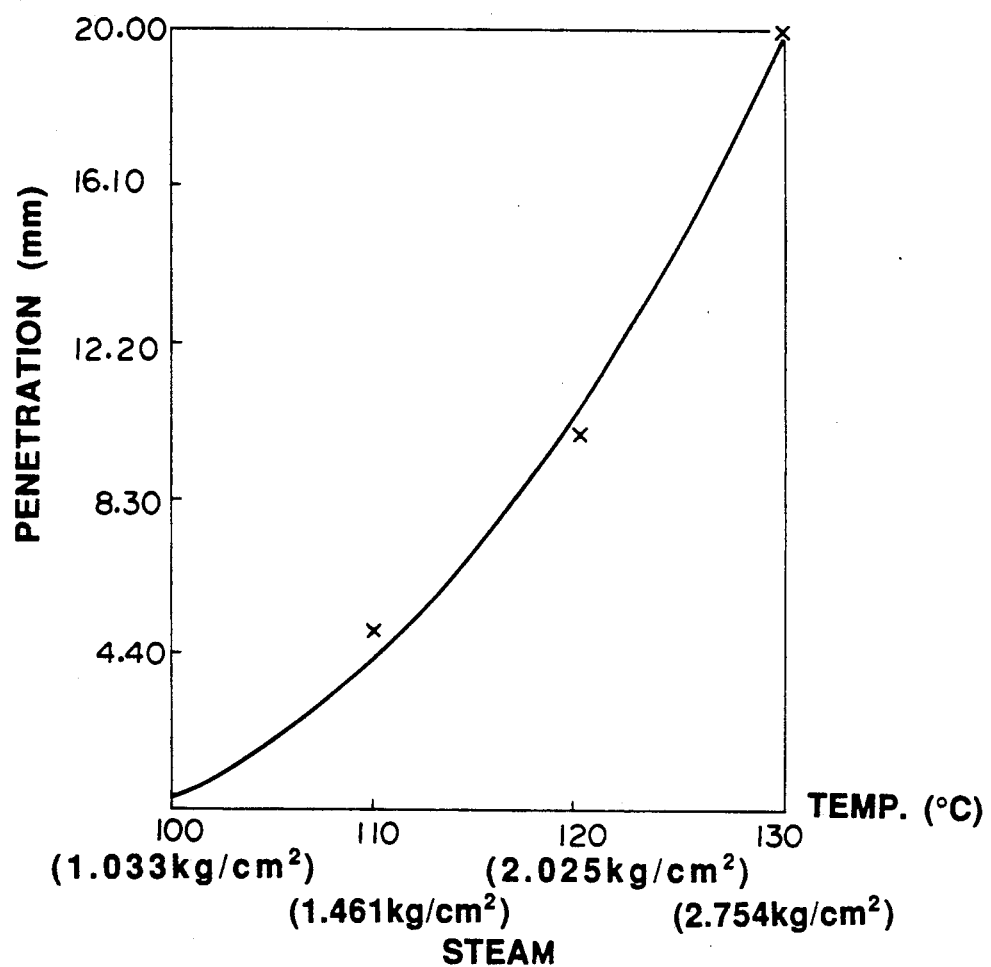
FIG. 3 is a graph showing the relationship between penetration of steam and the temperature and pressure of the steam.

As can be seen from the foregoing Table 3 and FIG. 3, the penetration degree is exponentially increased according to rising of the steam temperature.

EXAMPLE 2

Figure 4:
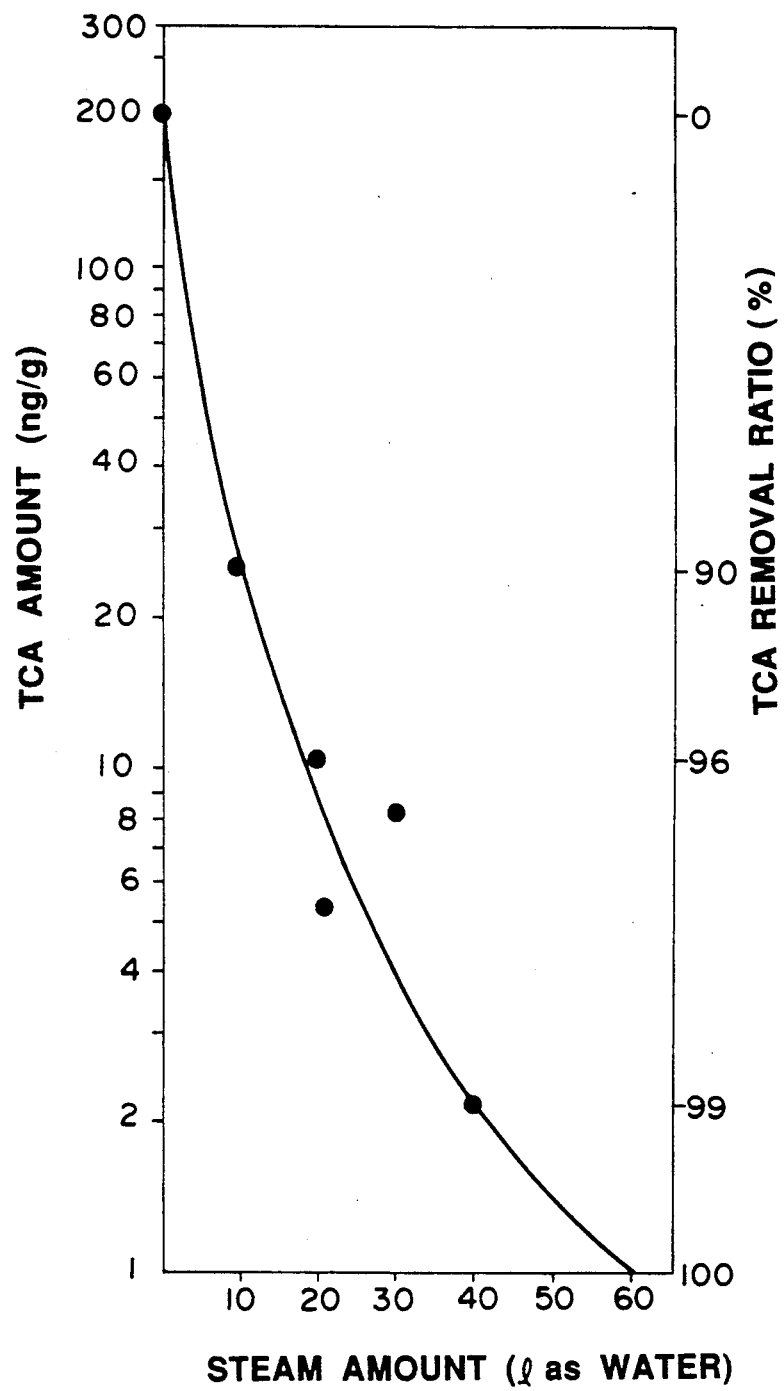
FIG. 4 is a graph showing a relationship between a total amount of supplied steam and TCA removal ratio.

A cork capping plug recognized as corked was crushed by a known cork crushing machine into a grain size ordinarily used for forming compressed cork, for forming sample cork pieces. 4 g of the sample cork pieces were put in a gauze bag (15 cm×20 cm). The sample cork containing bag is put in the mid portion of the cork burden in the container 1. Deodorization treatment was performed utilizing the apparatus of FIG. 2. In the treatment, the container 1 was rolled with successive variation of inclination angle. The steam was blown through the container 1 across the cork at a flow rate of 20 liter/hour and 40 liter/hour. The deodorization treatment was performed for 30 minutes, 60 minutes and 90 minutes after reaching predetermined condition, i.e. the temperature in the container was 120° C. and pressure was 1 Kg/cm². After treatment, residual TCA amount was checked. A check of residual TCA was performed by slicing the sample cork, extracting TCA from slices by n-pentane and measuring by gas chromatography. Results of the measurement are shown in Table 4 and FIG. 4.

TABLE 4

|  | Steam Flow Rate (20 l/hr) | | Steam Flow Rate (40 l/hr) | |
| --- | --- | --- | --- | --- |
|  | 25,25,18,22,24,28 19,30,32,32 (ng/g) | | 5,4,6,6,5,6,8,6,5 (ng/g) | |
| 30 min | Average Standard Error | 25.5 4.99 | Average Standard Error | 5.3 1.77 |
|  | CV (%) | 22.8% | CV (%) | 33.4% |
|  | Removal | 89.7% | Removal | 97.8% |
|  | 7,8,8,11,9,13,12, 13,13,12 (ng/g) | | 1,5,1,3,1,6,2,8,2,8 1,6,1,7,2,7,1,5,3,0 (ng/g) | |
| 60 min | Average Standard Error | 10.5 2.51 | Average Standard Error | 2.1 0.68 |
|  | CV (%) | 23.9% | CV (%) | 32.4% |
|  | Removal | 95.7 | Removal | 99.1 |
|  | 7,9,8,7,8,8,10,7, 9,10 (ng/g) | | | |
| 90 min | Average Standard Error | 8.3 1.16 | Average | ND |
|  | CV (%) | 14.0% | | |
|  | Removal | 96.6 | Removal | 100% |

As can be appreciated, the present invention is successful in achieving the object and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A method for removing a substance which is contained in cork and which originates an offensive odor, said method comprising the steps of:
   putting cork into a container,
   heating water to generate steam flow of a given temperature,
   supplying the generated steam flow to said container,
   controlling steam pressure flow and temperature within said container at a predetermined pressure and temperature below that required for preventing degradation of cork propertise and above that required for promoting penetration of said steam flow into the internal structure of the cork, so as to promote evaporation of said a substance which originates an offensive odor
   discharging said steam flow along with the evaporated substance from said container.

2. The method as set forth in claim 1, wherein said substance is 2,4,6-trichloroanisole.

3. The method as set forth in claim 1, wherein said substance is 2,4,6-trichlorophenol.

4. The method as set forth in claim 1, wherein said cork is cut into a plurality of pieces.

5. The method as set forth in claim 4, which further comprises a step of agitating said cork pieces in said container.

6. The method as set forth in claim 5, wherein said agitating step is comprised of rotating and/or oscillating said container.

7. The method as set forth in claim 1, wherein the temperature of the supplied steam flow is between 100° C–130° C.

8. The method as set forth in claim 1, which further comprises a step of monitoring temperature within said container, and wherein pressure within said container is controlled on the basis of the monitored temperature.

9. The method as set forth in claim 1, which further comprises the step of cooling said cork in said container after stopping supply of said steam flow to the container and discharge of the steam from the container.

10. The method as set forth in claim 9, wherein said cooling step is such that said cork in said container is cooled at a preselected rate required for restricting the change in volume of the cork during said cooling step to within an allowable range.

11. The method as set forth in claim 9, wherein said cooling step comprises the steps of:
   maintaining said cork within said container while stopping the supply and discharge a steam to effect cooling of the cork until a temperature within said container becomes a predetermined temperature.

12. The method as set forth in claim 11, which further comprises the steps of monitoring temperature within said container, generating and supplying a hot atmosphere to the interior of said container and wherein flow rate of the supplied hot atmosphere is controlled on the basis of the monitored temperature.

13. The method as set forth in claim 11, wherein said cooling step further comprises the steps of:
   generating a hot atmosphere, and
   supplying said hot atmosphere to the interior of said container after said predetermined temperature is reached.

14. The method as set forth in claim 1, wherein said predetermined pressure is greater than or equal to 760 mmHg.

* * * * *

UNITED STATES PATENT AND TRADEMARK OFFICE
CERTIFICATE OF CORRECTION

PATENT NO. : 5,174,956

DATED : December 29, 1992

INVENTOR(S) : Ichiro Konishi, Ryoichi Tajima and Tetsuo Tsutsumi

It is certified that error appears in the above-identified patent and that said Letters Patent is hereby corrected as shown below:

Claim 1 should read as follows:

-- 1. A method for removing a substance which is contained in cork and which originates an offensive odor, said method comprising the steps of:
 putting cork into a container,
 heating water to generate steam flow of a given temperature,
 supplying the generated steam flow to said container,
 controlling steam flow pressure and temperature within said container at a predetermined pressure and temperature below that required for preventing degradation of cork properties and above that required for promoting penetration of said steam flow into the internal structure of the cork, so as to promote evaporation of a substance which originates an offensive odor, and

UNITED STATES PATENT AND TRADEMARK OFFICE
CERTIFICATE OF CORRECTION

PATENT NO. : 5,174,956

DATED : December 29, 1992

INVENTOR(S) : Ichiro Konishi, Ryoichi Tajima and Tetsuo Tsutsumi

It is certified that error appears in the above-identified patent and that said Letters Patent is hereby corrected as shown below:

```
     discharging said steam flow along
with the evaporated substance from said
container. --
```

Signed and Sealed this

Twenty-third Day of November, 1993

Attest:

BRUCE LEHMAN

Attesting Officer     Commissioner of Patents and Trademarks